US007618259B2

(12) United States Patent
Manos

(10) Patent No.: US 7,618,259 B2
(45) Date of Patent: Nov. 17, 2009

(54) WORKSHEET WIZARD—SYSTEM AND METHOD FOR CREATING EDUCATIONAL WORKSHEETS

(75) Inventor: John Manos, Rochester, NY (US)

(73) Assignee: Hewlett-Packard Development Company, L.P., Houston, TX (US)

(\*) Notice: Subject to any disclaimer, the term of this patent is extended or adjusted under 35 U.S.C. 154(b) by 650 days.

(21) Appl. No.: 10/845,273

(22) Filed: May 13, 2004

(65) Prior Publication Data

US 2005/0255438 A1 Nov. 17, 2005

(51) Int. Cl.
*G09B 3/00* (2006.01)
(52) U.S. Cl. .................. 434/322; 434/112; 434/350
(58) Field of Classification Search ............. 434/112, 434/322, 350, 362
See application file for complete search history.

(56) References Cited

U.S. PATENT DOCUMENTS

| 6,018,617 | A | * | 1/2000 | Sweitzer et al. ............ 358/1.15 |
|---|---|---|---|---|
| 6,086,382 | A | * | 7/2000 | Thomas ....................... 434/323 |
| 6,091,930 | A | * | 7/2000 | Mortimer et al. ............ 434/362 |
| 6,149,438 | A | * | 11/2000 | Richard et al. .............. 434/322 |
| 6,164,974 | A | * | 12/2000 | Carlile et al. ................ 434/322 |
| 6,315,572 | B1 | * | 11/2001 | Owens et al. ................ 434/322 |
| 6,431,875 | B1 | * | 8/2002 | Elliott et al. ................ 434/322 |
| 6,772,081 | B1 | * | 8/2004 | Gedlinske et al. ........... 702/108 |
| 2002/0192631 | A1 | * | 12/2002 | Weir et al. ................... 434/350 |
| 2003/0180703 | A1 | * | 9/2003 | Yates et al. ................. 434/353 |

\* cited by examiner

*Primary Examiner*—Cameron Saadat

(57) ABSTRACT

A method, system, and computer program product for creating educational worksheets is provided. In one embodiment, a worksheet creation wizard receives worksheet selection criteria from a teacher. The worksheet selection criteria may include, for example, grade level, textbook title, and number of questions of a specific type and difficulty level. Question type may include multiple choice, true/false, and short answer. Once the selection criteria have been entered, the worksheet creation wizard retrieves appropriate questions matching the selection criteria from a question database and creates a worksheet. The worksheet creation wizard may also allow a teacher or administrator to enter questions into the question database as well as allows students to take practice exams utilizing questions from the question database and obtain instantaneous scoring results as well as possible explanations of answers.

30 Claims, 15 Drawing Sheets

100
Network

100
Network

400

1300

WORKSHEET WIZARD—SYSTEM AND METHOD FOR CREATING EDUCATIONAL WORKSHEETS

BACKGROUND OF THE INVENTION

1. Technical Field

The present invention relates to computer software and, more particularly to educational software, and even more particularly to software for creating worksheets.

2. Description of Related Art

In today's education system, classroom curriculums and lesson plans are becoming more challenging and time consuming to construct year after year. Parents ask teachers to make themselves available to students after school and off-hours to assist them with lessons. Meanwhile, school budget cuts force reduction in the number of teachers assistants and reduce time spent between students and teachers. Teachers are faced with higher education achievement goals each school year, but due to the increasing demands on their time, the likelihood of achieving those goals decreases.

One problem that confronts many teachers is the lack of a tool allowing them to create practice worksheets, tests, and quizzes for students dynamically and quickly. Each of these worksheets requires an adequate amount of time from the teacher to generate and review. However, with their services at a high demand, and student to teacher ratio rising, spare time for teachers is limited.

Typically teachers will receive lesson plans from textbook publishers. However, some teachers prefer not to use the material and would rather create their own. Furthermore, some of the textbook material is not covered or reviewed during the school year, thus, some modification to the worksheets are warranted. Since some worksheets are hard copied, they can easily get misplaced and storing them can be difficult. Furthermore, some worksheets that are on electronic media do not allow the flexibility to remove or modify problems. However, there are times when teachers need to add questions to or remove questions from the worksheet, but are unable to do so due to the lack of flexibility of the electronic media.

Usually a limited quantity of worksheets accompany the textbooks for individual chapter/units. If the students completed the worksheets and require additional practice on a chapter, teachers are required to create these themselves. In addition, many of the schools do not leverage other teachers' existing home-made practice problems who are also part of the same school district. It would be nice to have a process where teachers can review other teachers' worksheets within the same district to minimize time necessity of generating new tests, quizzes or homework problems.

Also missing in many schools is the ability for proactive students seeking additional practice problems to find extra problems and complete them at their own convenience. When students need additional help, they must contact their teacher and ask for such problems. The time for the student to request such material and for the teacher to generate such material can reach a couple days.

Therefore, it would be desirable to have a tool that allows students quick access to additional homework problems with instant results, allows teachers to minimize time to generate tests/quizzes/homework worksheets, and allows teachers within a district to leverage and pool common questions in a repository. Furthermore, it would be desirable to have a solution to creation of tests/quizzes/homework worksheets that reduces the administrative tasks at hand for creating worksheets and allows teachers to spend more time one on one with students.

SUMMARY OF THE INVENTION

The present invention provides a method, system, and computer program product for creating educational worksheets. In one embodiment, a worksheet creation wizard receives worksheet selection criteria from a teacher. The worksheet selection criteria may include, for example, grade level, textbook title, and number of questions of a specific type and difficulty level. Question type may include multiple choice, true/false, and short answer. Once the selection criteria have been entered, the worksheet creation wizard retrieves appropriate questions matching the selection criteria from a question database and creates a worksheet. The worksheet creation wizard may also allow a teacher or administrator to enter questions into the question database as well as allows students to take practice exams utilizing questions from the question database and obtain instantaneous scoring results as well as possible explanations of answers.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
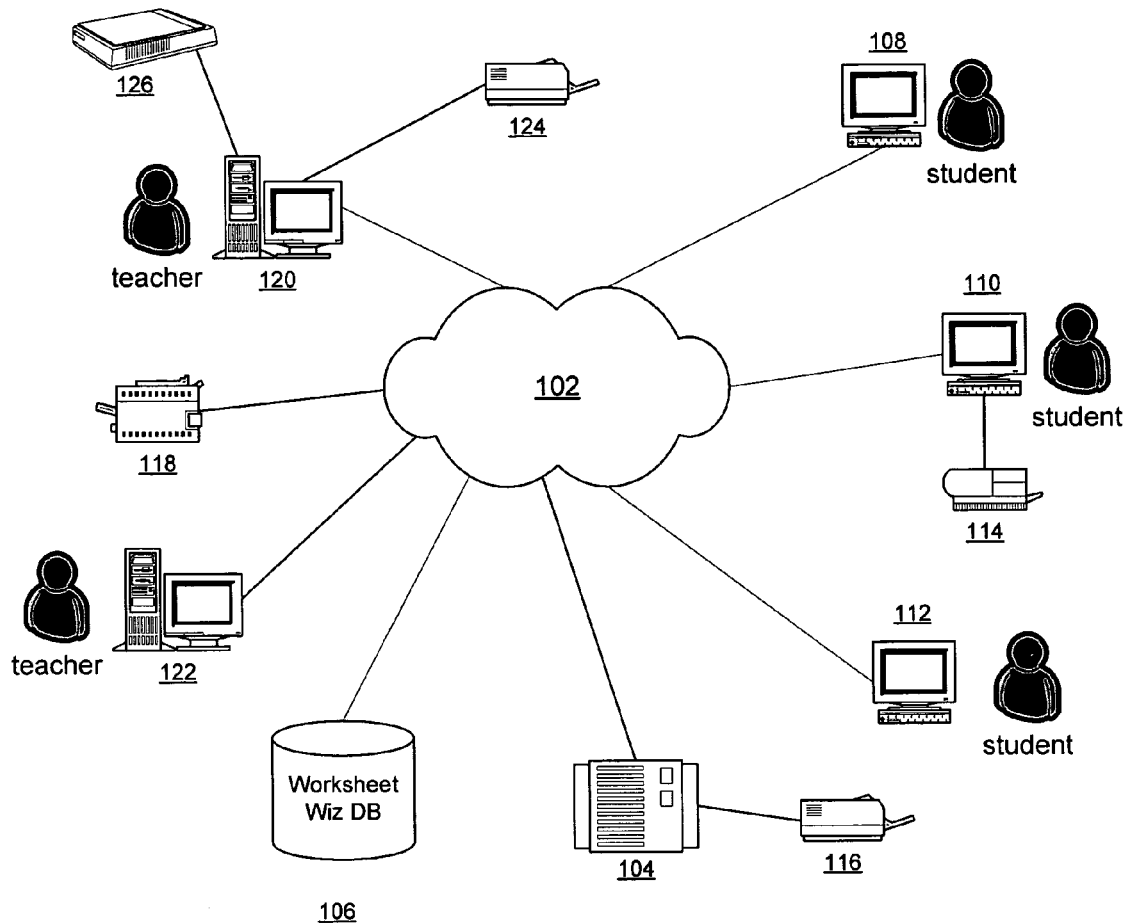
FIG. 1 depicts a pictorial representation of a distributed data processing system in which the present invention may be implemented.

With reference now to the figures, and in particular with reference to FIG. 1, a pictorial representation of a distributed data processing system is depicted in which the school worksheet wizard of the present invention may be implemented.

The worksheet wizard (Worksheet Wiz) of the present invention is a tool that allows teachers to enter questions into a repository, stored by the grade level, subject, chapter/topic and is capable of creating worksheets (test, quiz, homework) on demand without exerting much time. The questions can also be refined to include other information such for querying capability. Worksheet Wiz may also have a web portal allowing students to gain access and go through some of the problems at their convenience.

If Worksheet Wiz's repository is available throughout the school district, teachers in similar grades can input questions pertaining to their subject and allow other teachers to utilize their questions. The collaboration between the teachers can be used to optimize knowledge within the district and allow them to free up some time originally spent on worksheet creation.

Worksheet Wiz, in some embodiments, is designed to be platform independent, since many of the schools use Apple Macintosh as well as IBM clones. Thus, in some embodiments, the application will be designed to support both platforms as well as any other platforms desired.

Distributed data processing system 100 is a network of computers in which the worksheet wiz of the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. Storage unit 106 is the repository for worksheets created by teachers within the school. In addition, clients 108, 110, 112, 120, and 122 are also connected to network 102. These clients, 108, 110, 112, 120, and 122 may be, for example, personal computers or network computers. For purposes of this application, a network computer is any computer coupled to a network that receives a program or other application from another computer coupled to the network. In the depicted example, server 104 provides access to school worksheet wiz pages and data, to clients 108, 110, 112, 120, and 122. Clients 108, 110, 112, 120, and 122 are clients to server 104. Distributed data processing system 100 may include additional servers, clients, and other devices not shown.

Distributed data processing system 100 also includes printers 114, 116 and 118. A client, such as client 110 or client 120, may print directly to a printer 114 or 124 respectively. Clients such as client 108, client 112, and client 122 do not have directly attached printers. These clients 108, 112, and 122 may print to printer 116, which is attached to server 104, or to printer 118, which is a network printer that does not require connection to a computer for printing documents. Clients 110 and 120, alternatively, may print to printer 116 or printer 118, depending on the printer type and the document requirements.

In the depicted example, teachers utilize clients 120 and 122 to log into the worksheet wiz to create a quiz, worksheets, study questions, or an exam. The worksheet wiz application may be stored and executed on clients 120 and 122 or may be provided by server 106, such as, for example, through the use of web pages provided to clients 120 and 122. The teacher must authenticate themselves to the worksheet wiz in order to verify that the person logging on is a teacher and not an imposter, such as, for example, a student. This helps protect the integrity of the worksheets, quizzes, study questions, and exams created by a teacher.

Once the teacher is logged into the worksheet wiz, the teacher may enter new questions or peruse a list of previously entered questions in order to create. If entering questions, the teacher may simply type the questions into, for example, client 120, or, alternatively, may scan a sheet of questions into the worksheet wiz through, for example, scanner 128. The worksheet wiz may include character recognition software to determine the content of the scanned document so that the questions from the document may be separated from one another and stored as searchable content on worksheet wiz database 106.

Questions may be organized by several different categories in a searchable database 106. For example, questions may be tagged with information that indicates the grade level (e.g., $1^{st}$ grade, $2^{nd}$ grade, $11^{th}$ grade), the main subject area (e.g., math, reading, foreign language, geography), and sub-sets of subject areas (e.g., addition, subtraction, multiplication, etc.). Questions may also be tagged with information indicating the source of the question (e.g., the teacher who first created or entered the question into the worksheet wiz or the workbook or textbook from which the question was drawn). Other information, as will be recognized by those skilled in the art, may be stored with the questions as well. Thus, a teacher can search on a number of different areas in order to locate and retrieve appropriate questions to peruse.

Once the teacher has retrieved and/or entered a list of questions, the teacher can select those questions that should be included in a quiz, worksheet, study guide, or exam. Alternatively, the teacher may merely select the type of questions, the level of difficulty, and the number to include and allow the worksheet wizard to select the questions that match the teacher's criteria. The worksheet wiz then creates the appropriate document, formatted according to standardized methods or formatted according to a teacher customizable format, and stores the document (e.g., exam, quiz, worksheet, study guide) in worksheet wiz database 106. Additional information, such as, for example, the date created, document name, subject area, and teacher name maybe stored in worksheet wiz database 106 as well and associated with the document to allow a teacher or student to search the database 106 for a specific document.

Once the document has been created and stored, the teacher may print the document to, for example, printer 124. Alternatively, students may retrieve the document via network 102 using, for example, one of clients 108-112. The students may answer the questions on-line through clients 108-112 and have instant feedback presented regarding whether they answered correctly and, if not, be presented with the correct answer and possibly the rationale behind why the one answer is correct. Alternatively, the students may print the document to, for example, printer 114, and study and/or answer the questions at a later time.

Other teachers may also retrieve documents created by other teachers. Thus, if a document suitable for a teacher's needs already exists within the worksheet wiz, then rather than having to create a new document, the teacher may choose instead to utilize an existing document. Thereby, saving the teacher time and allowing the teacher to devote more time to interacting with the students and less time to administrative tasks. Furthermore, because teachers can search and observe individual test questions created by others, if a document completely suiting a teacher's needs is not present in the worksheet wiz database 106, the teacher can perhaps create a document by simply selecting appropriate questions from a list of questions already contained within worksheet wiz database 106, thereby still saving precious time for the teacher. Also, because the teacher may select from existing questions or enter new questions and mix and match pre-existing questions with newly entered questions, the teacher can create completely customized quizzes, exams, worksheets, and study guides, but can do so with minimal effort and certainly with much less effort than if the teacher had to create the questions, type the questions, and format the document.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet, a school's local area network (LAN), or a wide area network (WAN). Furthermore, in addition to passwords and user identifications, security measures, such as, for example, encryption and implementation of a virtual private network, may be utilized in order to protect the integrity of the system.

FIG. 1 is intended as an example and not as an architectural limitation for the processes of the present invention.

Figure 2:
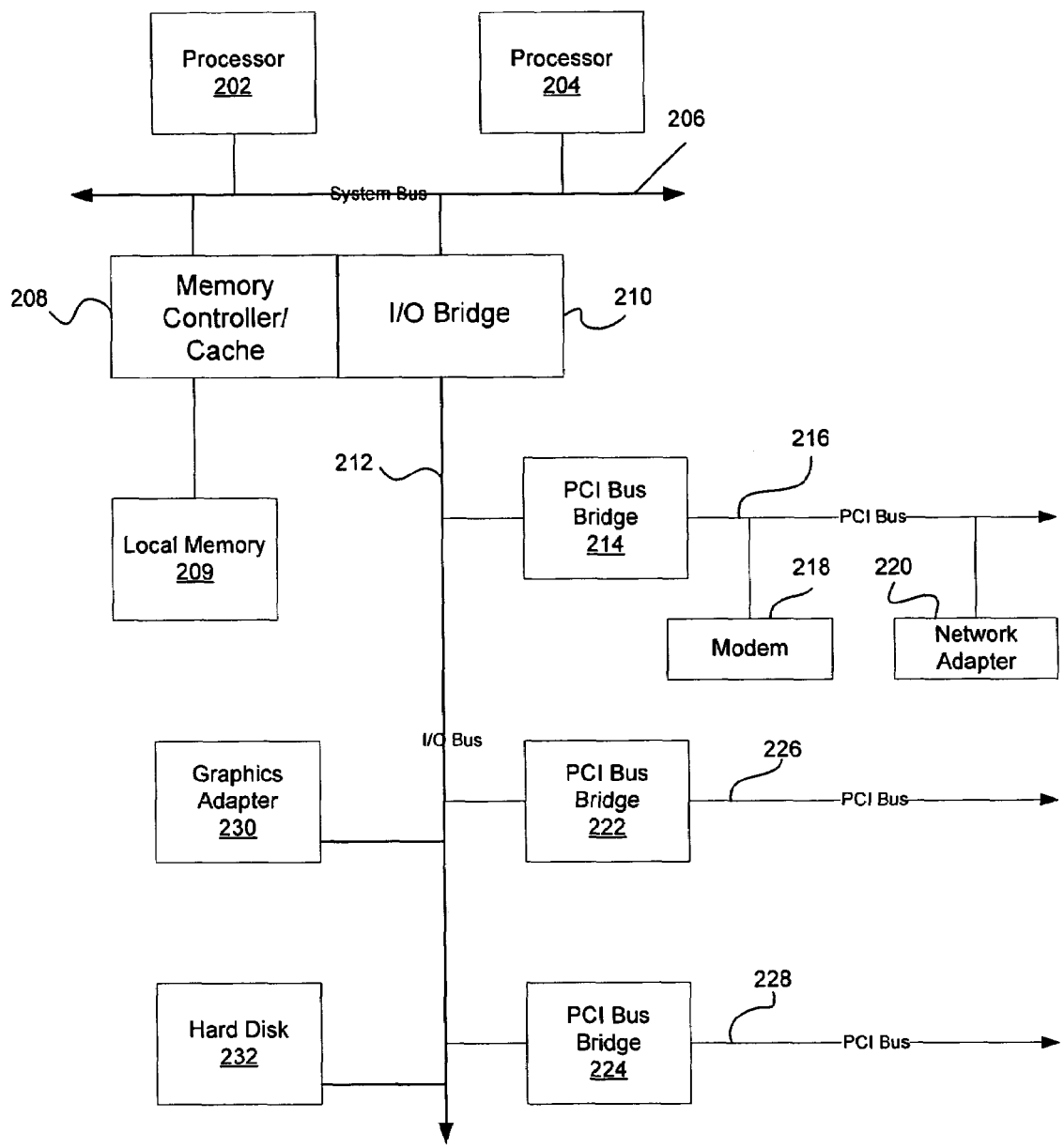
FIG. 2 depicts a block diagram of a data processing system which may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Data processing system 200 may be implemented as, for example, an AlphaServer GS1280 running a UNIX® operating system. AlphaServer GS1280 is a product of Hewlett-Packard Company of Palo Alto, Calif. "AlphaServer" is a trademark of Hewlett-Packard Company. "UNIX" is a registered trademark of The Open Group in the United States and other countries With reference now to FIG. 3, a block diagram of a data processing system in which the present invention may be implemented is illustrated. Data processing system 300 is an example of a client computer, such as, for example any one of clients 108, 110, 112, 120, and 122 depicted in FIG. 1. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

Figure 3:
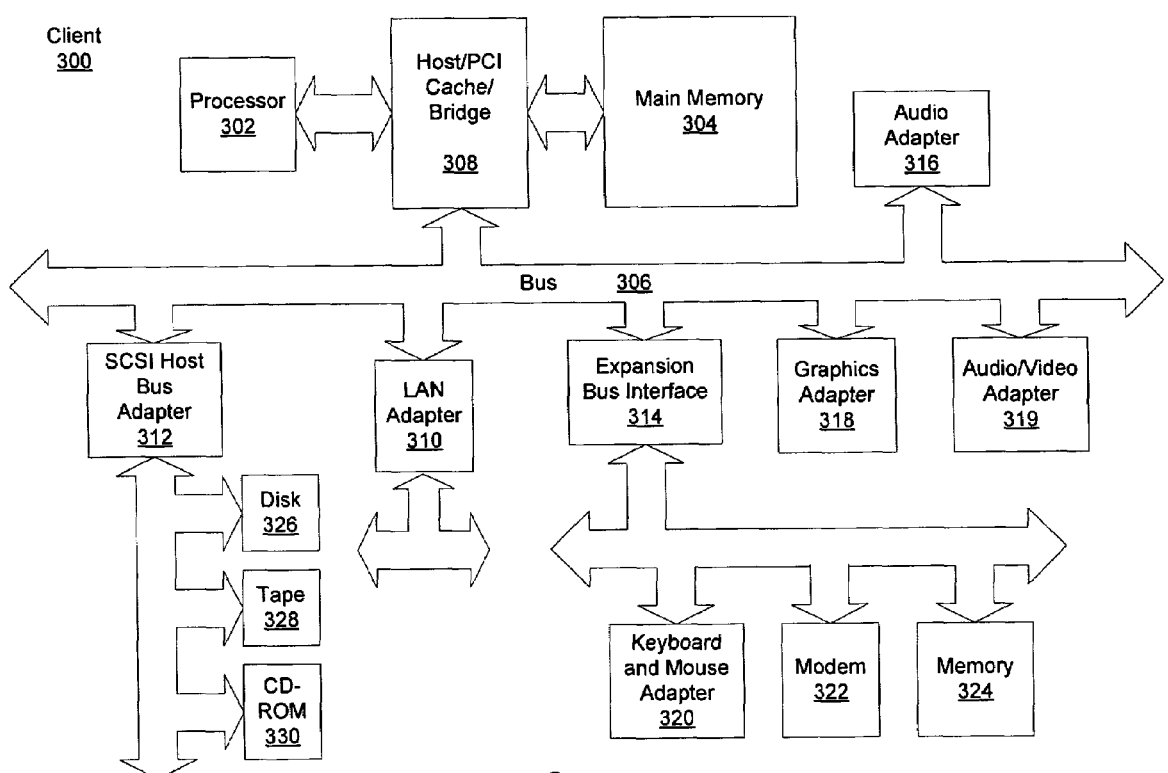
FIG. 3 depicts a block diagram of a data processing system in which the present invention may be implemented.

An operating system runs on processor 302 and is used to coordinate and provide control of various components within data processing system 300 in FIG. 3. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
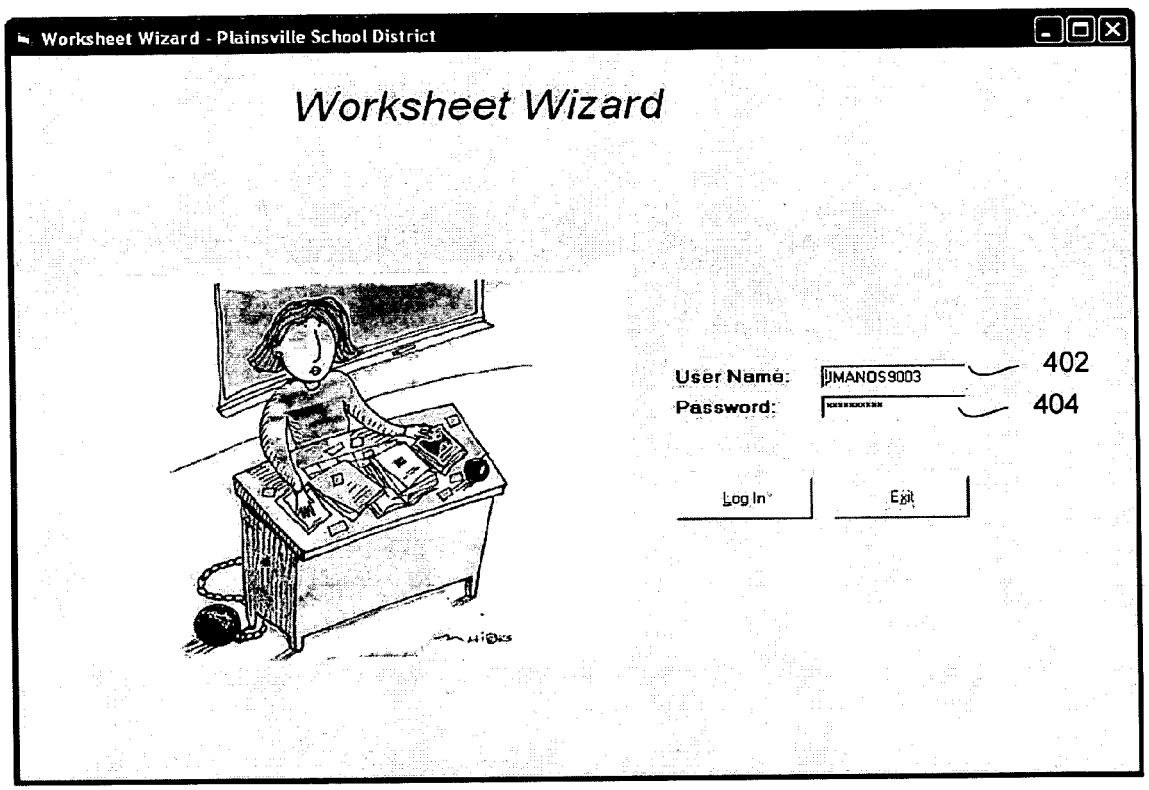
FIGS. 4-11 depict exemplary user interfaces illustrating creation of a worksheet in accordance with one embodiment of the present invention.

Turning now to FIGS. 4-11, exemplary user interfaces illustrating creation of a worksheet are depicted in accordance with one embodiment of the present invention. Teachers are able to access Worksheet Wiz from either a client machine in their classroom, webpage, or from their home machine. Initially, a login page 400 as depicted in FIG. 4 will be presented to the user allowing the user to enter a user name 402 and password 404.

Figure 5:
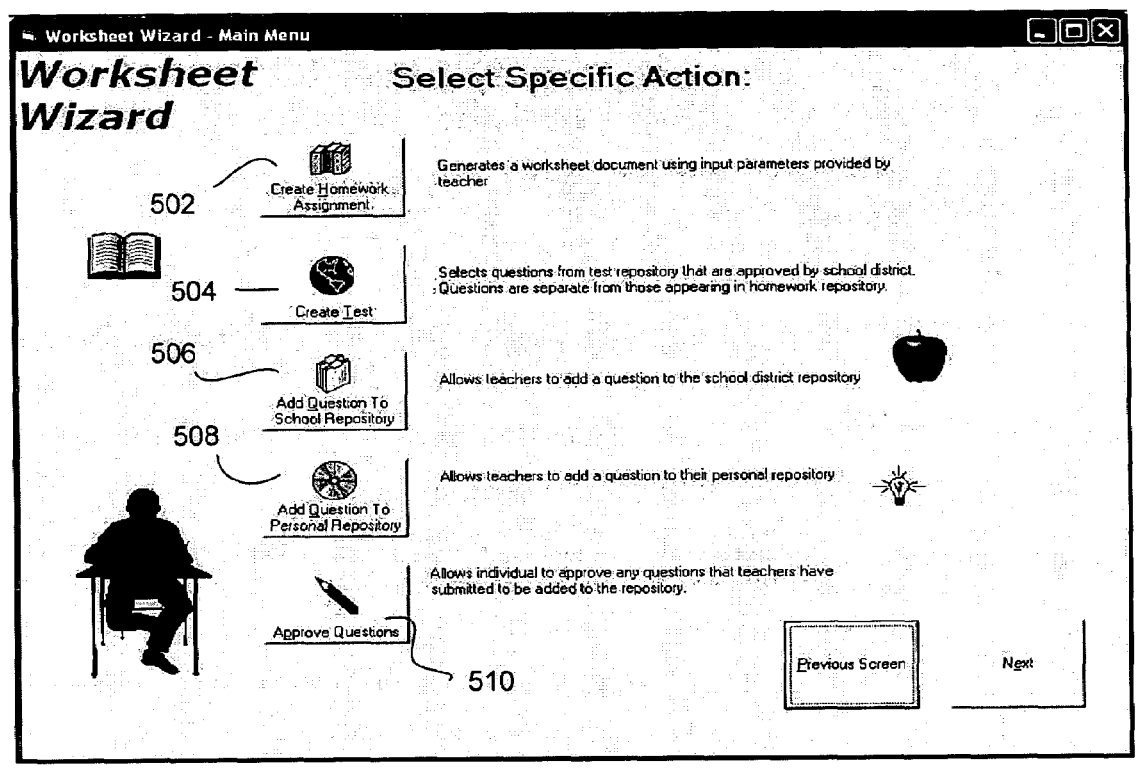
Figure 6:
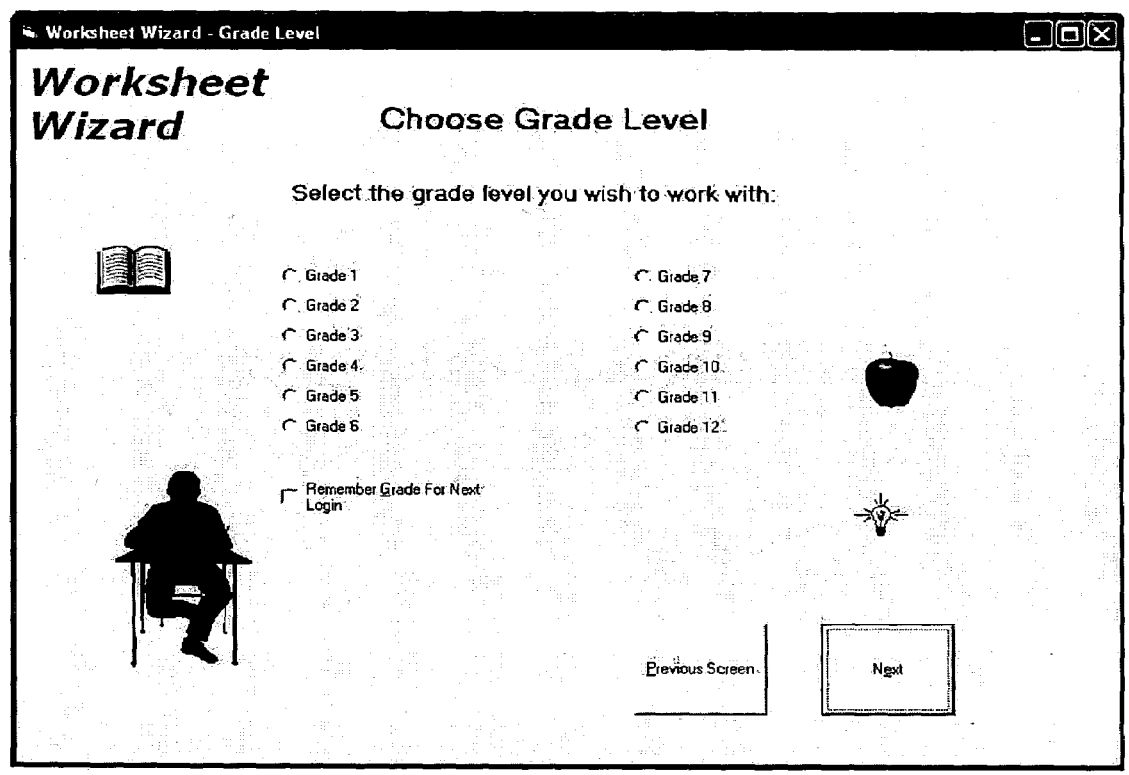
Figure 7:
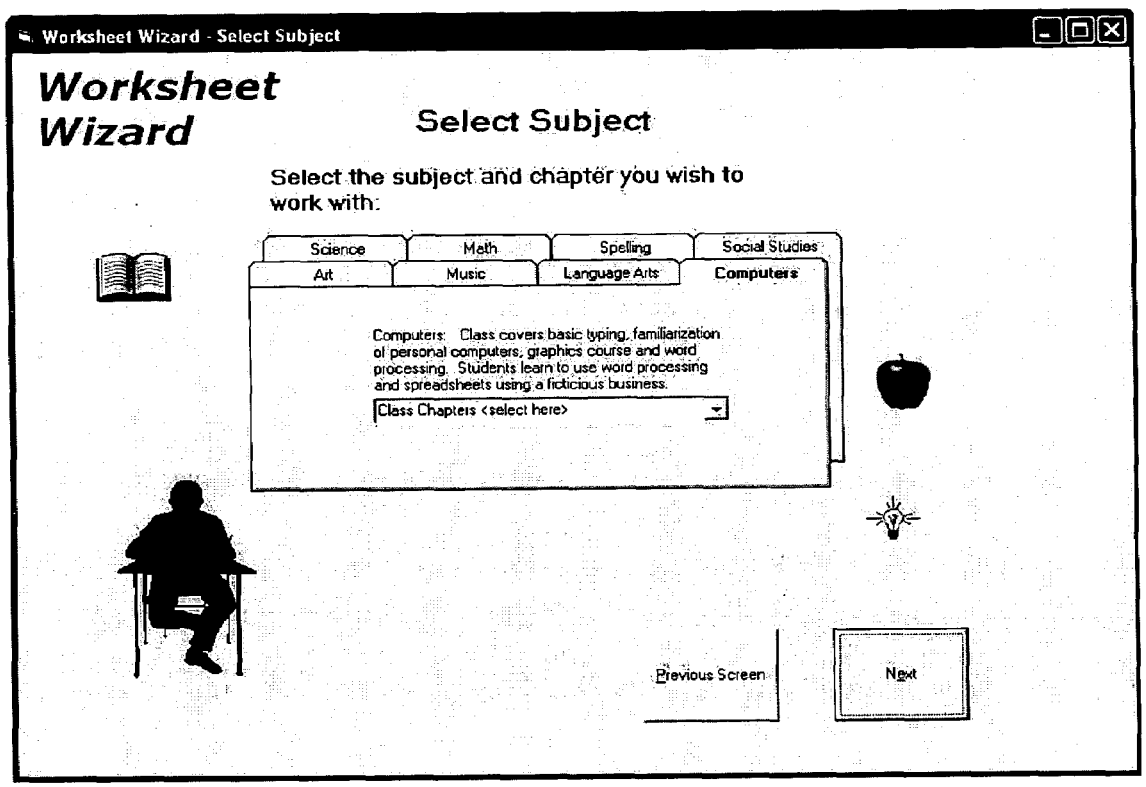

Once logged in, teachers will be presented with an interface 500 depicted in FIG. 5 allowing the teacher to choose what action they would like to perform. For example, the teacher may have the selection choices 502-510. In this example, the five choices 502-510 a teacher can select are 1) Creating a homework assignment 502, 2) Creating a test 504, 3) Submit a question to the school repository 506, 4) Save a question to personal repository 508, 5) Approve a question submitted to the school repository 510 (typically, only a select few will have this privilege).

Figure 8:
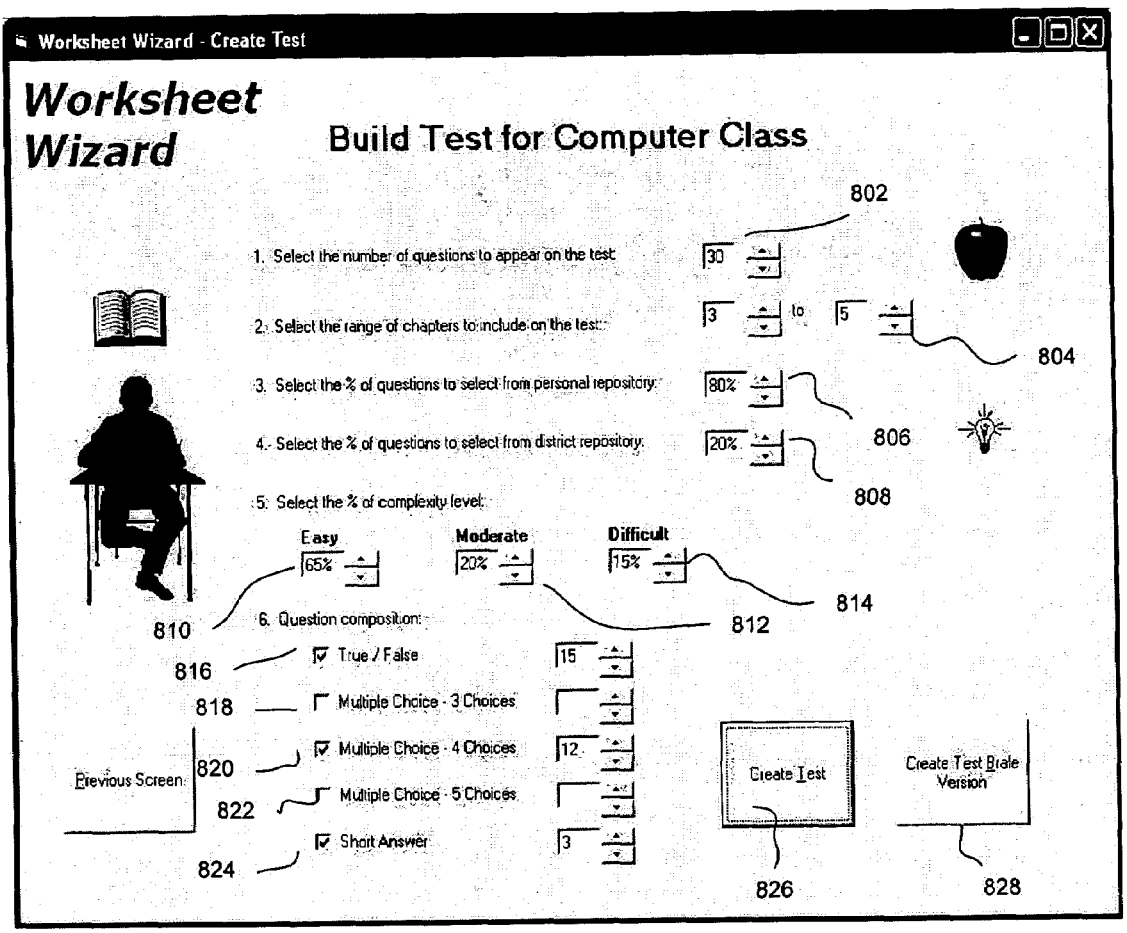
Figure 9:
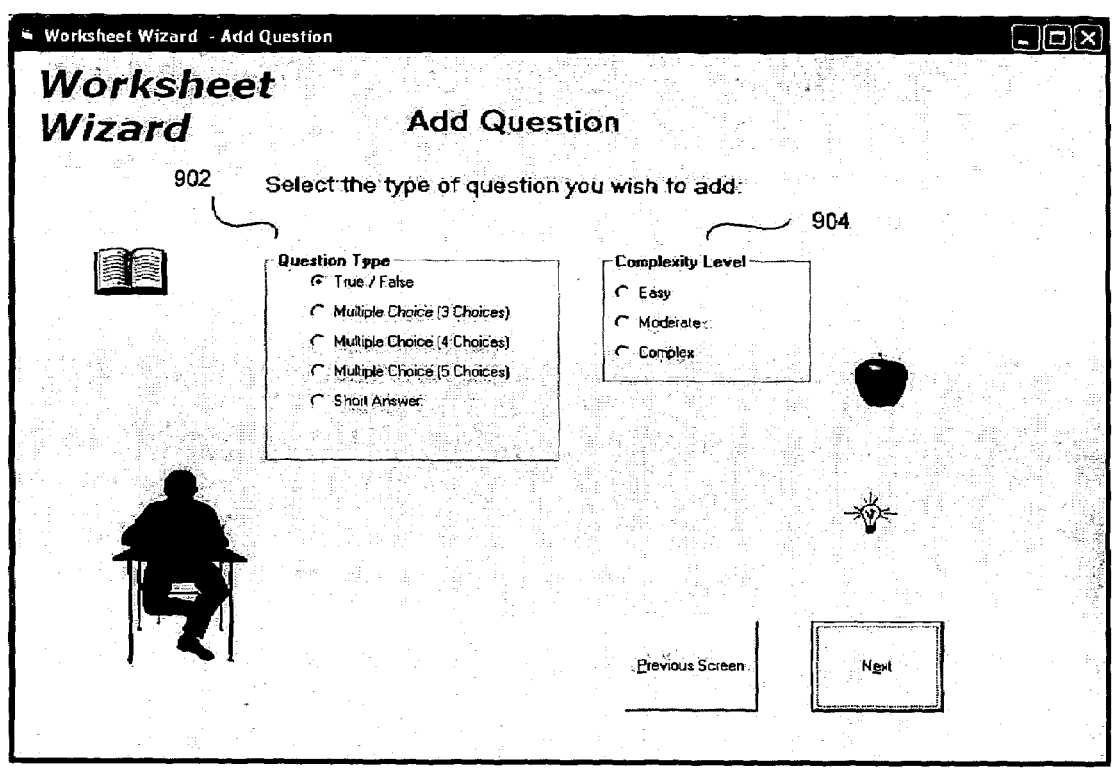
Figure 10:
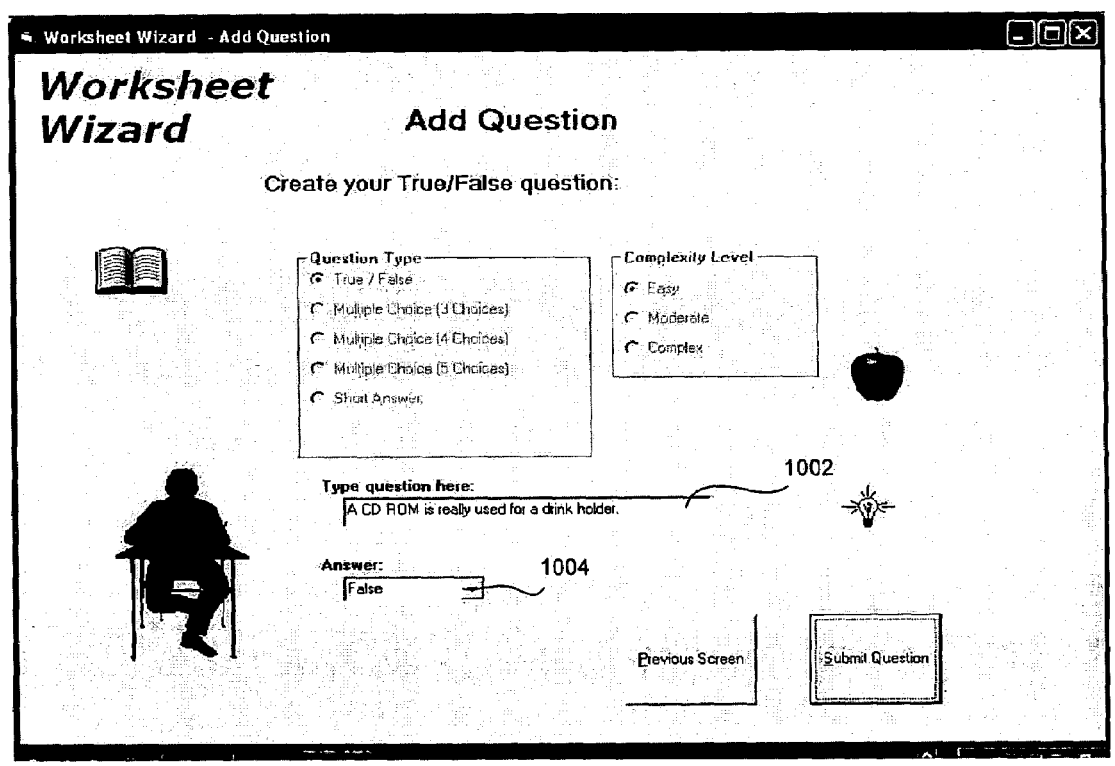

If a teacher wishes to create a test, they would select "Create Test" 504 from the screen 500 displayed in FIG. 5. The next sequence of screens 600, 700, and 800 that appear, will ask for the grade you are looking to build a test for (See FIG. 6), the subject/chapter (See FIG. 7), and the detailed requirements for building a test (See FIG. 8). Screen 800 in FIG. 8 is where a teacher can specify the # of questions 802, range of chapters to include on the test 804, where to retrieve the questions from (the teachers own personal repository or the school districts repository) 806 and 808, the % of questions that should be easy/moderate/difficult questions 810-814 and question composition 816-824. A suggested feature will be to either print the test 826 and make multiple copies, and also to print a Braille version 828 for students that may be blind. If there is a shared Braille printer used by the district, we can utilize the specific drivers for that printer and make it easy for teachers to produce a Braille printout.

If a teacher decides to add questions to the repository by selecting the third choice 506 in FIG. 5, they have a choice to input the question into a personal repository or into the district's repository. By selecting the third 506 or fourth choice 508 from screen 500 depicted in FIG. 5, users will see the "Add Question" 900 screen depicted in FIG. 9 which prompts a user to select a question type 902 (e.g., true/false, multiple choice (3 choices), multiple choice (4 choices), multiple choice (5 choices), short answer) and complexity level 904 (e.g., easy, moderate, and complex).

In a first scenario, we walk thru adding a True/False question. The teacher will select True/False, from the question type list 902, and choose the complexity level 904. Once those are completed, the lower half of the screen will display a textbox 1002, as depicted in screen 1000 in FIG. 10, where a teacher can type in the question, with the correct answer selected from drop down menu 1004.

Figure 11:
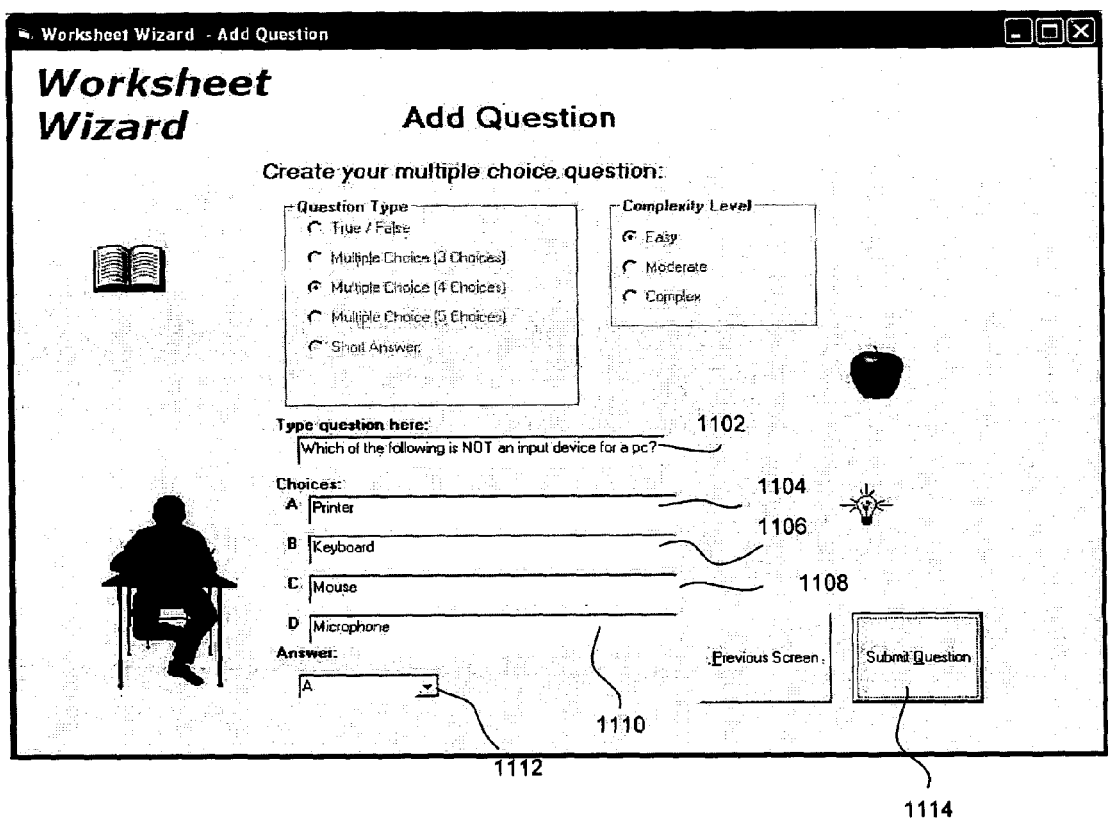
Figure 12:
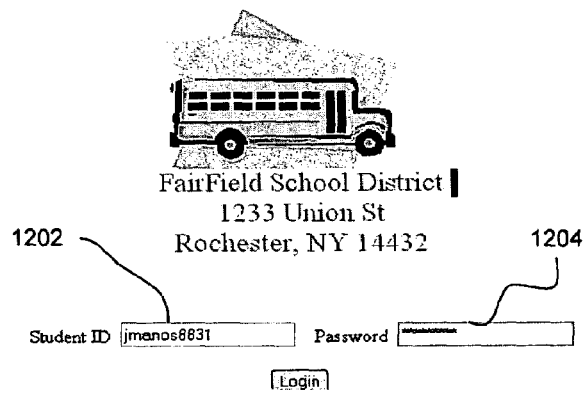
FIGS. 12-15 depict exemplary user interfaces for allowing students to log into the worksheet wiz, retrieve and use worksheets in accordance with one embodiment of the present invention.

A second scenario, illustrated by screen 1100 in FIG. 11, shows what a multiple choice question with 4 answers would look like. In this scenario, the teacher has selected multiple choice (4 choices) from question type 902 and a complexity level 904 from screen 900. Once the question 1102, answer choices 1104-1110, and correct answer from drop down list 1112 have been completed, the teacher submits the question to the repository by selecting submit question button 1114.

If the teacher decided to submit the question to the district repository by selecting the fourth choice 508, an approval team would then need to go in and determine whether the question is an acceptable question for the intended grade level and matches the complexity level described by the teacher. The approval process is only available to certain individuals by selecting the fifth choice 510 in screen 500 depicted in FIG. 5. The benefit of having an approval board for all questions submitted to the school districts repository is to receive feedback from others and verify the questions are suitable for the students. In the past 2003 school year, New York State (NYS) Math and Physics Regents exam were scrutinized for the difficult level of questions that students were held accountable for in comparison with 2002 exams. Having a governing body that approved complexity level of questions could help avoid such trouble.

Turning now to FIGS. 12-15, exemplary user interfaces for allowing students to log into the worksheet wiz, retrieve and use worksheets is depicted in accordance with one embodiment of the present invention. A web portal is provided that allows students to login to the districts website and select a particular class that they are seeking further assistance with. By logging into Worksheet Wiz's web portal screen 1200 with their student IDs 1202 and password 1204, the students have access to the same repository that teachers have provided. This will allow students to quickly access additional problems without waiting for teachers to create the worksheets. (However, some questions may be reserved by teachers for test or exam questions and not made available to the students.)

Figure 13:
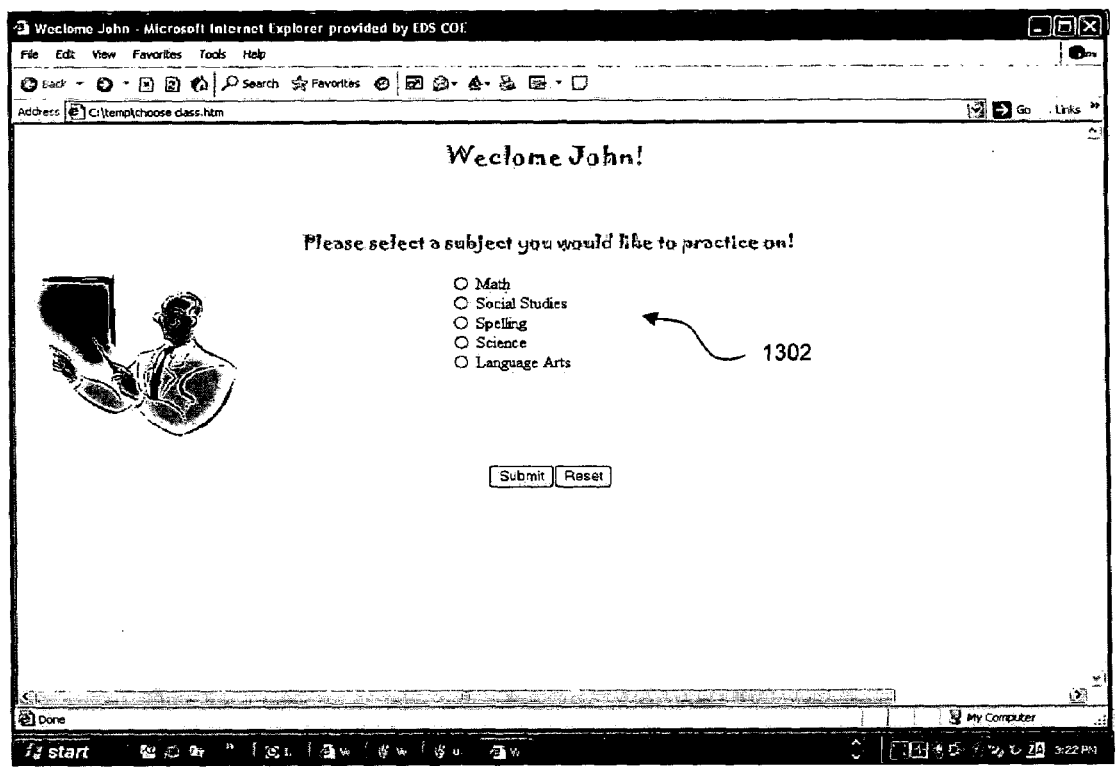
Figure 14:
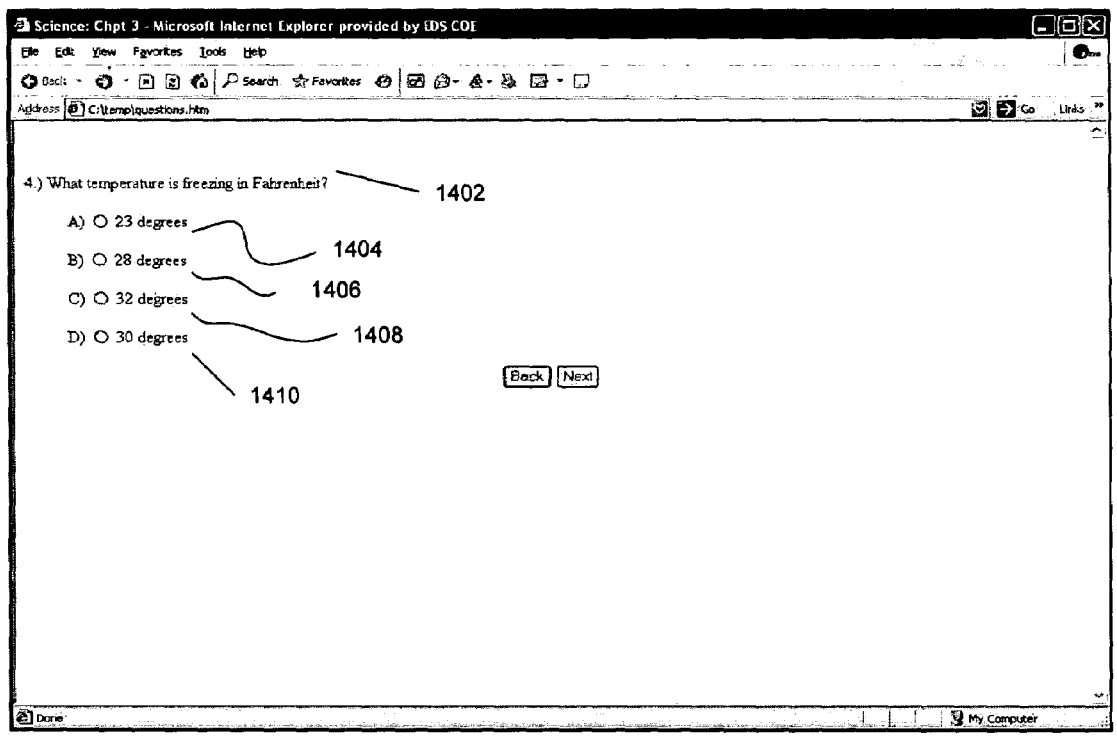
Figure 15:
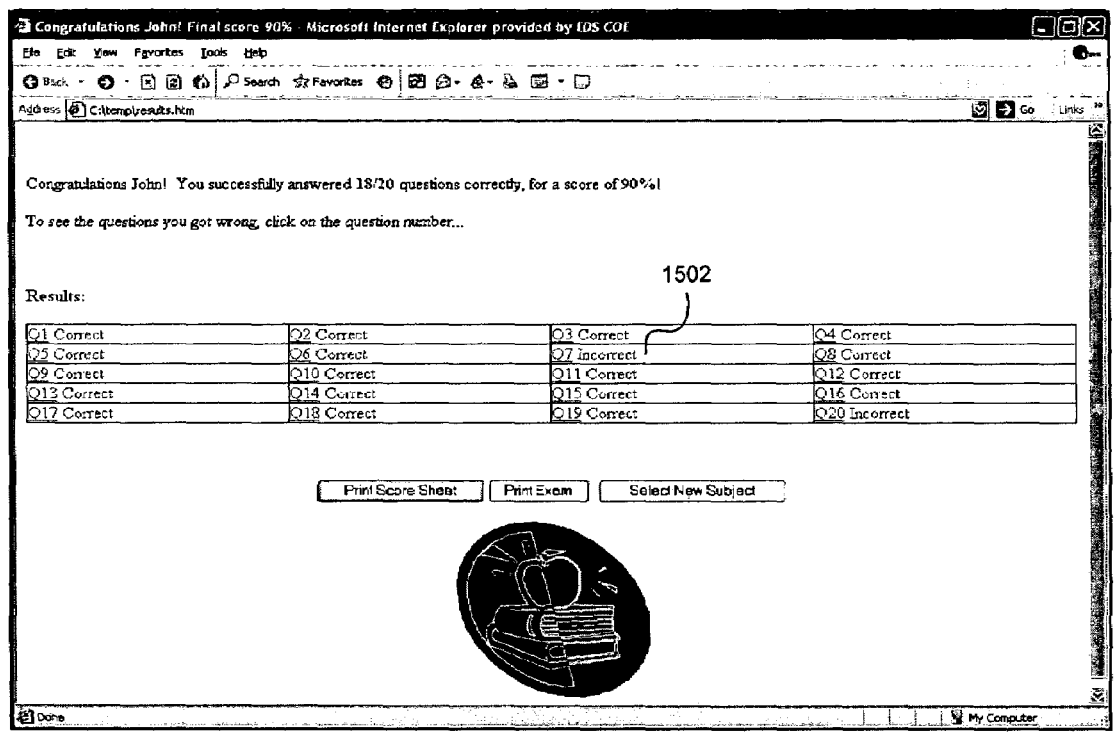

After logging into the worksheet wiz, the students will be presented with a subject selection screen 1300 depicted in FIG. 13 which will allow the student to select a subject from a list 1302. The students may then be presented with a choice as to the difficulty of questions, the number of questions of each selected difficulty level, and the number and type of questions desired from each difficult level selected. The students will then be presented a question 1402, as depicted in screen 1400 in FIG. 14, from their chosen subject in screen 1400 with possible answers 1404-1410 displayed for the student to select from. Once the student has answered all the questions presented, the student will be presented with a results screen 1500 as depicted in FIG. 15, which the results of the test and allows to view the questions by clicking on a question number, such as question Q7 1502. Thus, the students will be able to view the correct answer immediately without waiting. Parents will be able to assist by printing forms for their children and helping them with any questions.

In addition to the services and functionality described above, worksheet wiz could include additional enhancements. For example, worksheet wiz could include additional services that teachers use day to day. These services may include, for example, grade tracking for report cards, attendance, teacher notes, and calendar/journal entries and student information. Worksheet Wiz can also have instant messaging chat rooms where teachers and students can also communicate for any extra help. Worksheet Wiz can also expand to include 'books-online' reference material for students. This allow for easier, quicker and cheaper mechanism to updating the content.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for creating educational worksheets, the method comprising:
    receiving teacher-entered worksheet selection criteria entered by a teacher at a first remote client device;
    retrieving from a database, network-connection to the first remote client device, appropriate questions matching the selection criteria from a question database;
    receiving at the first remote client device, a teacher-entered question, not in the database;
    creating a worksheet using the appropriate questions from the database and the teacher-entered question;
    retrieving, at a second remote client device, by a student, the worksheet;
    answering, by the student at the second remote client device, questions contained in the worksheet; and
    presenting the student with results of answers made to the questions,
    wherein the question database comprises a plurality of personal question databases and a generic question database, wherein each of the plurality of personal question databases comprises questions selected by an individual teacher and the generic question database comprises questions approved by an approval committee.

2. The method as recited in claim 1, wherein the worksheet selection criteria comprise at least one of grade level, subject area, question type, number of questions, and difficulty level.

3. The method as recited in claim 2, wherein difficulty level choices include easy, medium, and difficult.

4. The method as recited in claim 2, wherein the question type choices include multiple choice, true/false, and short answer.

5. The method as recited in claim 1, wherein receiving teacher-entered worksheet criteria comprises presenting a user with a graphical user interface.

6. The method as recited in claim 1, further comprising:
   prior to receiving the teacher-entered worksheet criteria, determining a user identity and verifying that the user is authorized to create a worksheet.

7. The method as recited in claim 6, wherein determining the user identity and verifying that the user is authorized to create a worksheet comprises receiving a user ID and user password.

8. The method as recited in claim 1, wherein the worksheet is formatted in Braille to accommodate the needs of a blind student.

9. The method as recited in claim 1, further comprising:
   presenting the worksheet in a format suitable for the special needs student.

10. The method as recited in claim 9, wherein the presenting the worksheet in a format suitable for the special needs student comprises printing the worksheet in Braille.

11. A computer program product in a computer readable media for use in a data processing system for creating and using an educational worksheet, the computer program product comprising:
    first instructions for receiving teacher-oriented worksheet selection criteria entered by a teacher at a first remote client device;
    second instructions for retrieving from a database, network connected to the first remote client device, appropriate questions matching the selection criteria from a question database and for receiving at the first remote client device, a teacher-entered question not in the database;
    third instructions for creating the worksheet using the appropriate questions from the database and the teacher-entered question;
    fourth instructions for retrieving, at a second remote device, by a student, the worksheet;
    fifth instructions for answering, by the student at the second remote client device, questions contained in the worksheet; and
    sixth instructions for presenting the student with results of answers made to the questions,
    wherein the question database comprises a plurality of personal question databases and a generic question database, wherein each of the plurality of personal question databases comprises questions selected by an individual teacher and the generic question database comprises questions approved by an approval committee.

12. The computer program product as recited in claim 11, wherein the worksheet selection criteria comprise at least one of grade level, subject area, question type, number of questions, and difficulty level.

13. The computer program product as recited in claim 12, wherein difficulty level choices include easy, medium, and difficult.

14. The computer program product as recited in claim 12, wherein the question type choices include multiple choice, true/false, and short answer.

15. The computer program product as recited in claim 11, wherein receiving teacher-entered worksheet criteria comprises presenting a user with a graphical user interface.

16. The computer program product as recited in claim 11, further comprising:
    seventh instructions for, prior to receiving worksheet criteria, determining a user identity and verifying that the user is authorized to create a worksheet.

17. The computer program product as recited in claim 16, wherein determining the user identity and verifying that the user is authorized to create a worksheet comprises receiving a user ID and user password.

18. The computer program product as recited in claim 11, wherein the worksheet is formatted in Braille to accommodate the needs of a blind student.

19. The computer program product as recited in claim 11, further comprising:
    seventh instructions for presenting the worksheet in a format suitable of the special needs student.

20. The computer program product as recited in claim 19, wherein the seventh instructions comprise the worksheet in Braille.

21. A system for creating and using an educational worksheet, the system comprising:
    first means for receiving teacher-entered worksheet selection criteria entered by a teacher at a first remote client device;
    second means for retrieving from a database, network connected to the first remote client device, appropriate questions matching the selection criteria from a question database and for receiving at the first remote client device, a teacher-entered question not in the database;
    third means for creating the worksheet using the appropriate questions and the teacher-entered question;
    fourth means for retrieving at a second remote client device, by a student, the worksheet;
    fifth means for answering, by the student at the second remote client device, questions contained in the worksheet; and
    sixth means for presenting the student with results of answers made to the questions,
    wherein the question database comprises a plurality of personal question databases and a generic question database, wherein each of the plurality of personal question databases comprises questions selected by an individual teacher and the generic question database comprises questions approved by an approval committee.

22. The system as recited in claim 21, wherein the worksheet selection criteria comprise at least one of grade level, subject area, question type, number of questions, and difficulty level.

23. The system as recited in claim 22, wherein difficulty level choices include easy, medium, and difficult.

24. The system as recited in claim 22, wherein the question type choices include multiple choice, true/false, and short answer.

25. The system as recited in claim 21, wherein said first means for receiving worksheet criteria comprises means for presenting a user with a graphical user interface.

26. The system as recited in claim 21, further comprising:
    seventh means for, prior to receiving worksheet criteria, determining a user identity and verifying that the user is authorized to create a worksheet.

27. The system as recited in claim 26, wherein said seventh means for determining the user identity and verifying that the user is authorized to create a worksheet comprises receiving a user ID and user password.

28. The system as recited in claim 21, wherein the worksheet is formatted in Braille to accommodate the needs of a blind student.

29. The system as recited in claim 21, further comprising: seventh means for presenting the work sheet in a format suitable for the special needs student.

30. The system as recited in claim 29, wherein the seventh means comprise printing the worksheet in Braille.

* * * * *

UNITED STATES PATENT AND TRADEMARK OFFICE
CERTIFICATE OF CORRECTION

PATENT NO.         : 7,618,259 B2
APPLICATION NO.    : 10/845273
DATED              : November 17, 2009
INVENTOR(S)        : John Manos It is certified that error appears in the above-identified patent and that said Letters Patent is hereby corrected as shown below:

In column 10, line 62, in Claim 25, after "worksheet" insert -- selection --.

In column 12, line 2, in Claim 29, delete "work sheet" and insert -- worksheet --, therefor.

Signed and Sealed this

Twenty-third Day of February, 2010

David J. Kappos
*Director of the United States Patent and Trademark Office*